United States Patent Office

3,539,624
Patented Nov. 10, 1970

3,539,624
PREPARATION OF VINYLACETIC ACID
Martin B. Hocking, Sarnia, Ontario, Canada, assignor to The Dow Chemical Company, Midland, Mich., a corporation of Delaware
No Drawing. Filed Mar. 14, 1968, Ser. No. 712,934
Int. Cl. C07c 57/00, 57/08
U.S. Cl. 260—526                              2 Claims

ABSTRACT OF THE DISCLOSURE

Crotonic acid is isomerized in part to vinylacetic acid and isocrotonic acid by heating at 170–235° C. A mixture of isocrotonic acid and vinylacetic acid is separable from the isomerized material by distillation. Purified vinylacetic acid can be obtained from the distillate by a combination of thermal isomerization, crystallization, and distillation steps.

BACKGROUND OF THE INVENTION

This invention relates to a method for preparing and separating a non-conjugated olefinic carboxylic acid from its conjugated isomer. It relates particularly to a method for making vinylacetic acid from crotonic acid.

Vinylacetic acid, also named 3-butenoic acid, is an olefinic acid which in the past has not been readily available although it is of potential interest as a monomer which can be subjected to vinyl polymerization to produce a homopolymer or a copolymer having more or less pendant carboxy groups on the polymer chain. These polymers when combined with inorganic silicates produce effective fertilizer conditioners offering enhanced nutrient supply. The polymers can be made first and esterified or the monomer can be esterified with a saturated or an unsaturated alcohol and then polymerized to obtain polymers having various special properties. Saturated alcohol esters, for example, form stable polymer emulsions upon aqueous polymerization.

Vinylacetic acid has been made by a number of relatively complex and expensive procedures. One of the more practical known methods is the hydrolysis of allyl cyanide which in turn can be made from allyl chloride. Vinylacetic acid has also been made by a process involving the reaction of carbon monoxide with allyl chloride in the presence of a metal catalyst. None of these known methods has shown promise as a practical, commercial method for providing an inexpensive product.

Vinylacetic acid is the non-conjugated isomer of crotonic and isocrotonic acids which are the trans and cis forms respectively of 2-butenoic acid. Ordinarily, in a molecular system containing two olefinic bonds or, as here, an olefinic double bond and a carbonyl double bond and where both 1,3- and 1,4- relationships of the two unsaturated bonds are possible, a conjugated molecule where those two bonds are in 1,3- relationship is the normal and stable form. Thus, it is known that heat causes isomerization of crotonic acid to an equilibrium mixture of crotonic and isocrotonic acids, but little or no vinylacetic acid, the 1,4-isomer, has been found in previous isomerization experiments. Similarly, it is known that heating in the presence of sulfuric acid converts vinylacetic acid almost completely to crotonic acid in a very short time. On the basis of this knowledge, there would seem to be little chance of converting crotonic acids or isocrotonic acid to the apparently less-favored isomer, vinylaectic acid.

SUMMARY OF THE INVENTION

Surprisingly, it has now been found that upon continued heating at a relatively high temperature, 2-butenoic acid is converted in significant proportion to vinylacetic acid. More particularly, it has been found that vinylacetic acid can be obtained in quantity by a process which includes the steps:

(1) heating 2-butenoic acid, i.e., crotonic acid, isocrotonic acid, or mixtures thereof, at 170–235° C. for a time sufficient to isomerize a part of said acid to vinylacetic acid, (2) distilling the isomerized mixture to obtain a distillate consisting essentially of isocrotonic acid and vinylacetic acid, (3) heating said distillate at 120–165° C. until at least about 50% of the isocrotonic acid therein has been isomerized to crotonic acid, and (4) separating a fraction rich in vinylacetic acid from the heated distillate.

DETAILED DESCRIPTION

The fourth step can be either a distillation a crystallization wherein the heated distillate is cooled below about 25° C., thereby causing crystallization from the mixture of crotonic acid which can be separated from the mother liquor by filtration or decantation. The mother liquor then is a mixture of vinylacetic acid as the major component with a lesser amount of isocrotonic acid, and some crotonic acid, and some dimerized acid. Preferably, the mother liquor is then distilled whereby the distillate is essentially a mixture of the lower boiling isocrotonic and vinylacetic acids and the residual crotonic acid and dimerized acid constitute the bulk of the distillation residue. In its most preferred embodiment, the fourth or separation step consists of a crystallization and a distillation of the resulting mother liquor. Distillation at reduced pressure of 0.001–0.5 atmospheres is preferred to minimize loss of vinylacetic acid.

Such a sequence of steps is based also on the secondary discovery that at the defined temperature, isocrotonic acid is thermally isomerized to crotonic acid at a much faster rate than that at which vinylacetic acid is isomerized to a 2-butenoic acid. This makes it possible to separate at least part of the isocrotonic acid from the original vinylacetic-isocrotonic acid distillate by selectively isomerizing it to the higher melting and higher boiling crotonic acid at a temperature where vinylacetic acid is only slightly affected, and separating at least part of the crotonic acid thereby formed by distillation or fractional crystallization, preferably a combination of the two, as described above.

Heating in the initial thermal isomerization step is preferably continued until the isomerized mixture contains at least 5% of isocrotonic acid. The distillation of this material is preferably carried out at about atmospheric pressure up to about five atmospheres pressure. At moderate superatmospheric pressure, both the pot temperature and the vapor temperature in the distillation column are maintained sufficiently high to cause continuing isomerization to vinylacetic acid at a significant rate within the distillation column. In this way, optimum yields of distillate rich in vinylacetic acid are obtainable.

By following a sequence of steps as outlined above, it is possible to produce a mixed acid containing about 60% of vinylacetic acid with the remainder largely isocrotonic acid. By repeating a similar sequence of isomerization and separation steps 3 and 4 as defined above, vinylacetic acid of better than 90% purity can be produced.

EXAMPLE 1

A quantity of 2.5 kg. of crotonic acid was heated in a glass flask at 175° C. for 24 hours. Following this treatment, a glass distillation column packed with glass helices (packed volume 90×2.5 cm.) and fitted with a variable takeoff reflux head was attached to the flask and the pot temperature raised to 187° C. to initiate distillation at atmospheric pressure. Distillation at a reflux ratio of 100:1 was continued under these conditions until about 600 g. of distillate had been obtained having the composition: 29 mole percent vinylacetic acid, 69 percent isocrotonic acid, and 2 percent crotonic acid (by nuclear magnetic resonance measurements).

A sample of 250 g. of this distillate was then heated at 165° C. for 24 hours. The thermally isomerized mixture then was cooled to 0° C., causing crystallization of crotonic acid. The crystals were separated by filtration and the filtrate was distilled at reduced pressure (120 mm. Hg) using a column and reflux ratio as described above to obtain a distillate boiling at 115–120° C. at this pressure. This distillate was then isomerized by heating at 165° C. for 20 hours and the isomerized mixture was then crystallized, filtered and redistilled under reduced pressure as before. The composition of the product at these various stages is shown in the following table with proportions expressed in mole percent.

|  |  | Composition mole, percent | | |
|---|---|---|---|---|
| | Amount, grams | Vinylacetic | Isocrotonic | Crotonic |
| Distillate fraction: | | | | |
| 1 | 9 | 16 | 74 | 10 |
| 2 | 32 | 19 | 76 | 5 |
| 3 | 37 | 26 | 71 | 3 |
| 4 | 43 | 32 | 66 | 2 |
| 5 | 41 | 35 | 64 | 1 |
| 6 | 98 | 36 | 64 | (1) |
| 7 | 113 | 35 | 65 | (1) |

[1] Trace.

The concentration of vinylacetic acid in the distillate can be increased to the desired level by the equilibration-crystallization-distillation technique of Example 1 or by other conventional means as previously discussed.

I claim:
1. A process for making vinylacetic acid which comprises the steps:
(1) heating crotonic acid at 170–235° C. for a time sufficient to isomerize at least about 5% of said crotonic acid to isocrotonic acid and vinylacetic acid,
(2) distilling the isomerized mixture to obtain a distillate consisting essentially of isocrotonic acid and vinylacetic acid,
(3) heating said distillate at 120–165° C. until at least about 50% of the isocrotonic acid therein has been converted to crotonic acid, and
(4) separating a fraction rich in vinylacetic acid from the heated distillate.

2. The process of claim 1 wherein the heated distillate is cooled below 25° C. to cause crystallization of crotonic acid, the crystallized crotonic acid is separated from the

| Component | First distillate (1) | Isomerized distillate (2) | Crystallized and distilled (3) | Reisomerized (4) | Second crystallization and distillation (5) |
|---|---|---|---|---|---|
| Vinylacetic acid | 29 | 27.5 | 60 | 57 | 84 |
| Isocrotonic acid | 69 | 18 | 35 | 10 | 14 |
| Crotonic acid | 2 | 34.5 | 5 | 22 | 2 |
| Crotonic dimer | 0 | 20 | 0 | 11 | 0 |
| Total weight, g | 250 | 250 | 79 | 79 | 41 |

EXAMPLE 2

Three kilograms of crotonic acid is heated in a reaction flask at 180° C. for 24 hours. The flask is then attached to the distillation column used in Example 1 in a manner to provide for operation under moderate pressure. Distillation is then started at a reflux ratio of 100:1 and an initial pot temperature of 202° C. at a pressure within the system of two atmospheres. A distillate consisting essentially of vinylacetic acid and isocrotonic acid is taken off at a boiling range of 180–183° with analysis of its composition from time to time as shown.

residual mother liquor and the mother liquor is distilled at an absolute pressure no greater than 0.5 atmosphere to obtain a distillate rich in vinylacetic acid.

References Cited

C. A., Chemical Abstracts, vol. 60 (1964), p. 13121d.

JAMES A. PATTEN, Primary Examiner

U.S. Cl. X.R.
203—28, 48, 91